(12) United States Patent
Ganewatta et al.

(10) Patent No.: US 12,195,651 B2
(45) Date of Patent: Jan. 14, 2025

(54) AMPHIPHILIC ADDITIVES AS COMPATIBILIZERS FOR ROSIN TACKIFIERS IN POLYOLEFIN HOT-MELT ADHESIVES

(71) Applicant: INGEVITY SOUTH CAROLINA, LLC, North Charleston, SC (US)

(72) Inventors: Mitra Shiran Ganewatta, Ladson, SC (US); Bing Wang, Mount Pleasant, SC (US); Christopher Johnson, Charleston, SC (US); John Widders, Mount Pleasant, SC (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 204 days.

(21) Appl. No.: 17/934,008

(22) Filed: Sep. 21, 2022

(65) Prior Publication Data

US 2023/0087482 A1 Mar. 23, 2023

Related U.S. Application Data

(60) Provisional application No. 63/247,060, filed on Sep. 22, 2021.

(51) Int. Cl.
| | |
|---|---|
| *C08J 11/06* | (2006.01) |
| *C09J 7/35* | (2018.01) |
| *C09J 11/06* | (2006.01) |
| *C09J 11/08* | (2006.01) |
| *C09J 123/08* | (2006.01) |

(52) U.S. Cl.
CPC .............. *C09J 7/35* (2018.01); *C09J 11/06* (2013.01); *C09J 11/08* (2013.01); *C09J 123/0815* (2013.01); *C09J 2301/304* (2020.08); *C09J 2301/408* (2020.08); *C09J 2301/414* (2020.08)

(58) Field of Classification Search
CPC ..... C09J 7/35; C09J 11/06; C09J 11/08; C09J 2301/408; C09J 2301/414; C09J 193/04; C09J 123/0815; C09J 2301/304
See application file for complete search history.

(56) References Cited

U.S. PATENT DOCUMENTS

| | | | | |
|---|---|---|---|---|
| 2,727,872 | A | * 12/1955 | Ropp | ................ C08F 18/04 |
| | | | | 522/182 |
| 9,303,195 | B2 | 4/2016 | Neumann et al. | |
| 10,450,484 | B2 | 10/2019 | Chen et al. | |
| 2010/0264369 | A1* | 10/2010 | Zhang | .................. A61L 15/56 |
| | | | | 252/301.35 |
| 2015/0148473 | A1* | 5/2015 | Sustic | .................... C08L 91/06 |
| | | | | 524/505 |

FOREIGN PATENT DOCUMENTS

| | | | | |
|---|---|---|---|---|
| CN | 110511703 | * | 11/2019 | |
| EP | 2749614 A1 | * | 7/2014 | ............ C09F 1/02 |
| JP | 2003183407 | * | 7/2003 | |
| JP | 2007146145 | * | 6/2007 | |

OTHER PUBLICATIONS

Translation of CN 110511703 (Year: 2019).*
Translation of JP2007146145 (Year: 2007).*
Translation of JP2003183407 (Year: 2003).*
Maki-Arvela, J. Am. Oil Chem. Soc. (2014) 91:1035-1046 (Year: 2014).*

* cited by examiner

*Primary Examiner* — Robert C Boyle
(74) *Attorney, Agent, or Firm* — Bryan D. Zerhusen; Nicholas R. Herrel; CANTOR COLBURN LLP

(57) ABSTRACT

Presently described are bio-based hot-melt adhesive compositions including rosin acids or derivatives thereof and an amphiphilic agent that provide adhesives with a high softening point, improved heat resistance, low melt viscosity, and compatibility with hydrocarbon compositions including polyolefins and waxes used in hot-melt adhesives.

22 Claims, 1 Drawing Sheet

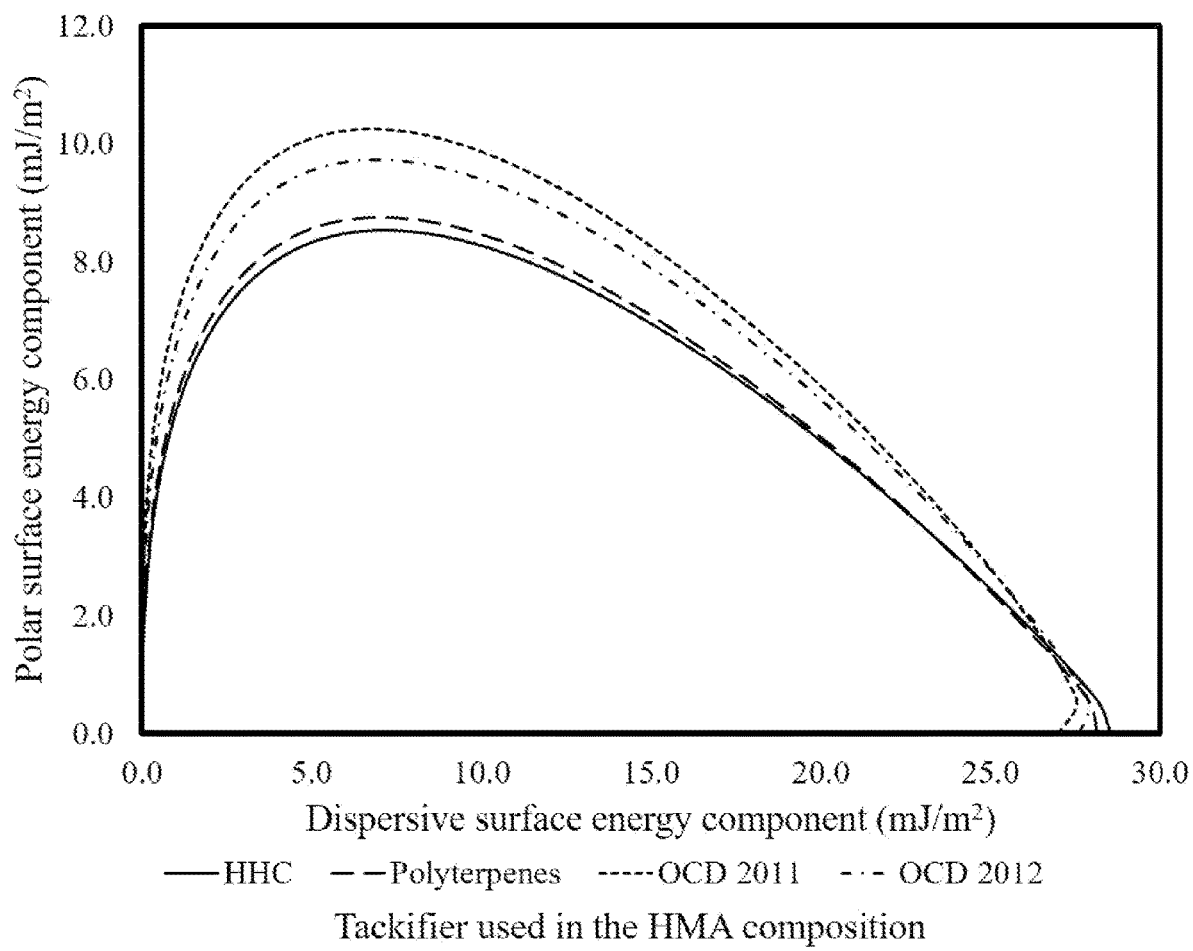

AMPHIPHILIC ADDITIVES AS COMPATIBILIZERS FOR ROSIN TACKIFIERS IN POLYOLEFIN HOT-MELT ADHESIVES

CROSS-REFERENCE TO RELATED APPLICATIONS

The present application claims the benefit of and priority to U.S. Provisional Application Ser. No. 63/247,060, filed 22 Sep. 2021, which is incorporated by reference herein in its entirety for all purposes.

BACKGROUND

Field of the Discovery

The present invention relates to hot-melt adhesive compositions comprising rosin acids and derivatives thereof and amphiphilic agents. In certain aspects the rosin acids, fatty acids, and derivatives thereof are derived from tall oil rosins, gum rosins or wood rosins.

Background Information

Rosin, a bio-renewable raw material, is commercially available, and can be obtained from pine trees by distillation of oleoresin (gum rosin being the residue of distillation), by extraction of pine stumps (wood rosin) or by fractionation of tall oil (tall oil rosin). Rosin contains a mixture of rosin acids, fatty acids, and other unsaponifiable compounds.

Adhesives help to bind two substrates together by providing efficient distribution of stress across a joint. Unlike mechanical fastening, welding or sewing, adhesives provide more flexibility in design and cost effectiveness. Adhesives have existed for thousands of years starting from natural materials such as beeswax and pine sap to more advanced thermoplastic polymeric materials that are used today to provide better service lives and ability to bind a variety of substrates. Adhesives can be categorized as reactive or non-reactive, solvent-born, solvent-free, or aqueous.

Hot-melt adhesives (HMA) are thermoplastic adhesive compositions applied in molten form (e.g., in the 65-210° C. range) which solidify on cooling to form strong bonds between a wide range of substrate surfaces used in packaging, non-woven applications, construction, appliance, the automotive industry, and general construction.

HMAs reduce or eliminate the need for volatile organic solvents (VOCs), thus eliminating the drying and/or curing step and advantageously, HMAs do not lose thickness during solidification. A conventional HMA for packaging composition includes a base polymer (e.g., 0-40 wt %) such as an ethylene-vinyl-acetate (EVA) copolymer that provides cohesive strength; a tackifying resin (e.g., 30-40 wt %) to improve adhesion and glass transition temperature; a wax component or wax package (e.g., 20-30 wt %) to reduce viscosity and cost, and other additives (e.g., 0.5-1.0 wt %) to improve properties such as wetting and oxidative stability.

Tackifiers in HMA compositions are used to increase tackiness via improved wetting and molecular interactions between the adhesive and substrate surfaces. In addition, they can influence the set speeds and can also increase the overall softening point of the HMA compositions. Tackifiers account for a significant portion of an adhesive composition, such as, for example, as high as 30-50 wt % or more of the composition.

Rosin tackifiers are produced by reacting C20 rosin acids or modified rosin acids with polyols such as ethylene glycol, glycerol, or pentaerythritol or mixtures thereof. Depending on the steric and molecular weight parameters a wide range of rosin tackifiers with varying softening points are available. Rosin tackifiers are useful to provide strong adhesion with a wide variety of substrate surfaces via hydrophobic and polar interactions. Hence, they have been successfully used in adhesive compositions including hot-melt adhesives and pressure sensitive adhesives for many decades.

With the increasing environmental concerns and demand for sustainable raw materials, tackifiers produced from bio-based materials are gaining substantial market attention. For example, polyterpene and rosin esters are commercially available as bio-based tackifiers.

However, in the early 2000's, metallocene-catalyzed polyolefins emerged as color and oxidation stable thermoplastic materials for hot-melt adhesives, shifting the focus from the traditional ethylene-vinyl-acetate (EVA) copolymers from the packaging industry. While EVA-based compositions use rosin-based tackifiers, polyolefins require more hydrophobic petroleum resource-based hydrogenated hydrocarbon tackifiers to maintain compatibility, water white color, and reasonable performance in HMA applications.

When traditional rosin esters such as pentaerythritol rosin esters (e.g., WestRez® 5101) are formulated with polyolefins, the blended adhesive turns an opaque white color and the phases separate during aging at elevated temperatures. Not wishing to be bound by theory, it is believed that the polar groups such as the ester groups, the remaining acid and/or the hydroxyl groups as well as more stable dehydroabietic isomers that result during the disproportionation process cause the incompatibility with the aliphatic base polymers and waxes in the adhesive composition.

While hydrogenated hydrocarbon tackifiers provide stability and compatibility in polyolefin HMA compositions, they lack functionality and have fewer adhesive characteristics compared to rosin ester tackifiers where the latter contain polar carboxylic acids, hydroxyls, and ester groups.

Therefore, to improve the adhesive performance of polyolefin HMAs and increase the bio-content, improved bio-based tackifiers are needed. One conventional approach is the use of polyterpene-based tackifiers in polyolefin compositions. However, polyterpene tackifiers result in high viscosity, darkening, and gelation during the high temperature aging process. In addition, hydrogenated polyterpene resins are not cost-effective.

Previous attempts have been made to incorporate rosin tackifiers into polyolefin-based HMA compositions. U.S. Pat. No. 10,450,484 discloses a composition comprising of rosin-based tackifiers and an anhydride and/or carboxylic acid functionalized ethylene/alpha-olefin interpolymer. Although, these functionalized polymers improve compatibility of rosin esters in polyolefin HMAs, they may cross-link under oxidative conditions and increase the viscosity and may result in gelation. In addition, functionalization of ethylene/alpha-olefin interpolymers is costly. Aliphatically-modified rosin resins and their method of production is described in U.S. Pat. No. 9,303,195. Although this new resin appears to be compatible with polyolefins, the softening point of the resin is below 100° C. which is not suitable for HMA applications.

Therefore, it is evident that there is a need for rosin-based tackifiers having softening points higher than 100° C.; preferably 105° C. to 115° C., low color, thermal stability, compatibility in polyolefin HMA compositions, and performance under a wide-range of temperatures, preferably −17° C. to 60° C.

SUMMARY

Presently described are hot-melt adhesive compositions including (i) rosin acids or derivatives thereof as tackifying agents and (ii) amphiphilic agents having a hydrocarbon portion and polar functional group. The compositions described herein surprisingly and unexpectedly are compatibilized and stable at a wide range of temperatures.

In any of the aspects or embodiments described herein, a hot-melt adhesive composition is disclosed comprising: a rosin acid or a derivative thereof and an amphiphilic agent comprising at least one hydrocarbon chain and a polar functional group, wherein the hydrocarbon chain is linear, branched or cyclic.

Further aspects, features, and advantages of the present invention will be apparent to those of ordinary skill in the art upon reading the following Detailed Description of the Preferred Embodiments.

BRIEF DESCRIPTION OF THE DRAWINGS

The FIGURE shows the wetting envelopes of the HMA compositions. Those compositions including the rosin acid or derivative thereof and an amphiphilic agent provide superior results to those compositions using tackifying agents, such as HHC and polyterpene.

DETAILED DESCRIPTION

The present disclosure will now be described more fully hereinafter, but not all embodiments of the disclosure are shown. While the disclosure has been described with reference to exemplary embodiments, it will be understood by those skilled in the art that various changes can be made and equivalents can be substituted for elements thereof without departing from the scope of the disclosure. In addition, many modifications can be made to adapt a particular structure or material to the teachings of the disclosure without departing from the essential scope thereof.

Where a range of values is provided, it is understood that each intervening value between the upper and lower limit of that range and any other stated or intervening value in that stated range is encompassed within the invention. The upper and lower limits of these smaller ranges can independently be included in the smaller ranges is also encompassed within the invention, subject to any specifically excluded limit in the stated range. Where the stated range includes one or both of the limits, ranges excluding either both of those included limits are also included in the present disclosure.

The following terms are used to describe the present invention. In instances where a term is not specifically defined herein, that term is given an art-recognized meaning by those of ordinary skill applying that term in context to its use in describing the present invention.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the 10 United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a nonlimiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc. It should also be understood that, unless clearly indicated to the contrary, in any methods claimed herein that include more than one step or act, the order of the steps or acts of the method is not necessarily limited to the order in which the steps or acts of the method are recited.

Exemplary Aspects and Embodiments

Surprisingly and unexpectedly, the inventors discovered that rosin ester tackifiers can be emulsified in HMA compositions using amphiphilic agents having a polar head group and an aliphatic tail in their molecular architecture, providing improved compatibility over a range of temperatures.

As described above, polyolefins require more hydrophobic petroleum resource-based hydrogenated hydrocarbon tackifiers to maintain compatibility, water white color, and reasonable performance in HMA applications. However, because of environmental concerns and demand for sustainable raw materials, tackifiers produced from bio-based materials are desirable. Conventional bio-based tackifiers such as polyterpene tackifiers result in high viscosity, darkening, and gelation during the high temperature aging process and are costly.

Thus, in an aspect, the description provides an HMA composition comprising a rosin acid or a derivative thereof and an amphiphilic agent comprising at least one $C_6$-$C_{50}$ hydrocarbon chain and a polar functional group, wherein the hydrocarbon chain is linear, branched or cyclic.

Advantageously, the compositions described herein provide improved compatibility over a range of temperatures.

In any of the aspects or embodiments described herein, the HMA compositions include a rosin acid or a derivative thereof.

In any of the aspects or embodiments described herein, the combination of rosin acid and the amphiphilic agent of the HMA compositions is not a plant oil, crude tall oil, distilled tall oil, coconut oil, palm oil, rosin, tall oil rosin, gum tree rosin, wood rosin, softwood rosin, hardwood rosin, or a combination thereof.

In any of the aspects or embodiments described herein, rosin acids include $C_{20}$ mono-carboxylic acids with a core having a fused carbocyclic ring system comprising double bonds that vary in number and location. For example, in any of the aspects or embodiments described herein, the rosin acids include abietic acid, neoabietic acid, pimaric acid, levopimaric acid, sandaracopimaric acid, isopimaric acid, and palustric acid. TOR can further contain dimerized rosin acids and dehydroabietic acids formed during the Kraft process and distillation of CTO. In any of the aspects or embodiments described herein, the natural oil includes vegetable oil, safflower oil, sesame oil, canola oil, olive oil, oil, coconut oil, or a combination thereof.

In any of the aspects or embodiments described herein, the disclosed compositions can include rosin acid derivatives. In any of the aspects or embodiments described herein, the rosin acid derivatives include Diels-Alder adducts. Diels-Alder cycloaddition can be used to form what are commonly called "rosin adducts" from rosin acids. Diels-Alder adduction occurs with s-cis conjugated double bonds, or double bonds capable achieving a conjugated s-cis configuration. For example, in any of the aspects or embodiments described herein, abietic-type rosin acids undergo Diels-Alder adduction.

In any of the aspects or embodiments described herein, non-limiting exemplary dienophiles that can be used to react with conjugated dienes include maleic anhydride, fumaric acid, acrylonitrile, itaconic anhydride, and acrylic acid. Diels-Alder products obtained from the reaction of maleic anhydride with a rosin acid or a fatty acid have three carboxylic acid groups and are referred to as "maleated rosin." Similarly, Diels-Alder products obtained from the reaction of fumaric acid with a rosin acid have three carboxylic acid groups and are referred to as "fumarated rosin."

In any of the aspects or embodiments described herein, the rosin acid derivatives and fatty acid derivatives include dimers. The double bonds of rosin acids can react with each other to form rosin dimers. Similarly, the double bonds of fatty acids can react with each other to form fatty acid dimers. In any of the aspects or embodiments described herein, the rosin dimer molecule is a $C_{40}$-terpene, typically having two double bonds and two carboxylic acid groups. Rosin dimerization can be controlled to obtain appropriate levels of dimerization; hence the dimer rosin product may be a mixture of rosin and dimerized-rosin molecules.

In any of the aspects or embodiments described herein, the rosin acid derivatives include hydrogenation products. Because the unsaturated double bonds of rosin acids are prone to oxidation and cause discoloration of a product, it may be desirable to reduce the probability of oxidation by reducing the number of double bonds in a rosin acid. In any of the aspects or embodiments described herein, rosin acids can be partially hydrogenated to saturate one of the double bonds of the rosin acid or fully hydrogenated to saturate both double bonds.

In any of the aspects or embodiments described herein, the rosin acid derivatives include dehydrogenation products, also referred to as disproportionation products. This process can be used to reduce the conjugated double bonds in some rosin acids, making the resulting disproportionated rosin less susceptible to oxidation. The reaction takes places between the dienes of two identical rosin acids, where one is hydrogenated and the other is dehydrogenated, thus altering the ratios of the rosin acids from the untreated rosin.

In any of the aspects or embodiments described herein, the rosin acid derivatives include oxidized rosin acids. The double bonds of rosin acids are prone to isomerization and oxidation when exposed to heat, air, light, and mineral acids thus providing a mixture oxidation products.

In any of the aspects or embodiments described herein, the rosin acid derivatives can include rosin esters. In any of the aspects or embodiments described herein, the rosin esters are derived from palmityl alcohol, stearyl alcohol, abietyl alcohol, polyethylene monoalcohol, hydroxyl-terminated polybutadiene, ethylene glycol, polyethylene glycol, propylene glycol, polypropylene glycol, glycerol, sorbitan, isosorbide, pentaerythritol, dipentaerythritol, tripentaerythritol, polypentaerythritol, or any combination thereof. In any of the aspects or embodiments described herein, the rosin acid derivatives can include esters of rosin derivatives such as disproportionated rosin, a maleated rosin, a fumarated rosin, itaconic acid adduct or anhydride adduct, an acrylic acid adduct, a dimer acid, or a combination thereof.

In any of the aspects or embodiments described herein, the rosin acids and derivatives thereof can be derived from wood rosin, gum rosin, or tall oil rosin. In any of the aspects or embodiments described herein, the rosin acid is derived from crude tall oil, rosin, tall oil rosin, gum tree rosin, wood rosin, softwood rosin, hardwood rosin, natural oil, distilled tall oil, derivatives thereof, or a combination thereof. In any of the aspects or embodiments described herein, the natural oil can include vegetable oil, safflower oil, sesame oil, canola oil, olive oil, oil, coconut oil, or a combination thereof.

In any aspect or embodiment described herein, the rosin acid or derivative thereof is present in an amount of about 50 to about 90 wt %, based on the total weight of the composition. In any aspect or embodiment described herein, the rosin acid or derivative thereof is present in an amount of about 60 to about 80 wt %, based on the total weight of the composition. For example, in any aspect or embodiment described herein, the rosin acid or derivative thereof is present in an amount of about 50 to about 90 wt %, about 50 to about 85 wt %, about 50 to about 80 wt %, about 50 to about 75 wt %, about 50 to about 70 wt %, about 50 to about 65 wt %, about 50 to about 60 wt %, about 50 to about 55 wt %, about 55 to about 90 wt %, about 55 to about 85 wt %, about 55 to about 80 wt %, about 55 to about 75 wt %, about 55 to about 70 wt %, about 55 to about 65 wt %, about 55 wt % to about 60 wt %, about 60 to about 90 wt %, about 60 to about 85 wt %, about 60 to about 80 wt %, about 60 to about 75 wt %, about 60 to about 70 wt %, about 60 wt % to about 65 wt %, about 65 to about 90 wt %, about 65 to about 85 wt %, about 65 to about 80 wt %, about 65 to about 75 wt %, about 65 to about 70 wt %, about 70 to about 90 wt %, about 70 to about 85 wt %, about 70 to about 80 wt %, about 70 to about 75 wt %, about 75 to about 90 wt %, about 75 to about 85 wt %, about 75 to about 80 wt %, about 80 to about 90 wt %, about 80 to about 85 wt %, or about 85 to about 90 wt %, based on the total weight of the composition.

In any of the aspects or embodiments described herein, the HMA compositions include an amphiphilic agent (also referred to as an emulsifier in the art) comprising at least one hydrocarbon chain with an average carbon number of 6 to 50 and a polar functional group, wherein the hydrocarbon chain is linear, branched or cyclic. In any of the aspects or embodiments described herein, the polar functional group can include a hydroxyl group, a carboxylic acid group, a carboxylic ester group other than a rosin ester group, an amide group, or an ethoxylate group. In certain embodiments, the functional group is a hydroxyl group. For example, in any of the aspects or embodiments described herein, amphiphilic agents include palmityl alcohol, stearyl alcohol, octadecanol, abietyl alcohol, a polyethylene monoalcohol, a fatty acid, a dimer of a fatty acid, a fatty amide, a fatty aldehyde, a fatty ester, rosin alcohol, rosin ester, rosin amide, or any combination thereof.

In any of the aspects or embodiments described herein, the amphiphilic agent has a melting point above 100° C., a softening point above 100° C., or a combination thereof. In any of the aspects or embodiments described herein, the amphiphilic agents includes a polyethylene monoalcohol that is a fully saturated linear primary alcohol having an average carbon number of about 50 (commercially available as, for example Unilin™ 10000 and Unilin™ 700). The amphiphilic agent can be present in any amount so as to not adversely affect the adhesive properties. For example, in any of the aspects or embodiments described herein, the amphiphilic agent can be present up to about 80 wt %, up to about 75 wt %, up to about 70 wt %, up to about 65 wt %, up to about 60 wt %, up to about 55 wt %, up to about 50 wt %, up to about 45 wt %, up to about 40 wt %, up to about 35 wt %, up to about 30 wt %, up to about 25 wt %, up to about 20 wt %, up to about 15 wt %, or up to about 10 wt %. By way of further example, in any of the aspects or embodiments described herein, the amphiphilic agent is present in an amount of about 10 wt % to about 80 wt %, about 10 wt % to about 75 wt %, about 10 wt % to about 70 wt %, about 10 wt % to about 65 wt %, about 10 wt % to about 60 wt %, about 10 wt % to about 55 wt %, about 10 wt % to about 50 wt %, about 10 wt % to about 45 wt %, about 10 wt % to about 40 wt %, about 10 wt % to about 35 wt %, about 10 wt % to about 30 wt %, about 10 wt % to about 25 wt %, about 10 wt % to about 20 wt %, about 10 wt % to about 15 wt %, about 15 wt % to about 80 wt %, about 15 wt % to about 75 wt %, about 15 wt % to about 70 wt %, about 15 wt % to about 65 wt %, about 15 wt % to about 60 wt %, about 15 wt % to about 55 wt %, about 15 wt % to about 50 wt %, about 15 wt % to about 45 wt %, about 15 wt % to about 40 wt %, about 15 wt % to about 35 wt %, about 15 wt % to about 30 wt %, about 15 wt % to about 25 wt %, about 15 wt % to about 20 wt %, about 20 wt % to about 80 wt %, about 20 wt % to about 75 wt %, about 20 wt % to about 70 wt %, about 20 wt % to about 65 wt %, about 20 wt % to about 60 wt %, about 20 wt % to about 55 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, about 25 wt % to about 80 wt %, about 25 wt % to about 75 wt %, about 25 wt % to about 70 wt %, about 25 wt % to about 65 wt %, about 25 wt % to about 60 wt %, about 25 wt % to about 55 wt %, about 25 wt % to about 50 wt %, about 25 wt % to about 45 wt %, about 25 wt % to about 40 wt %, about 25 wt % to about 35 wt %, about 25 wt % to about 30 wt %, about 30 wt % to about 80 wt %, about 30 wt % to about 75 wt %, about 30 wt % to about 70 wt %, about 30 wt % to about 65 wt %, about 30 wt % to about 60 wt %, about 30 wt % to about 55 wt %, about 30 wt % to about 50 wt %, about 30 wt % to about 45 wt %, about 30 wt % to about 40 wt %, about 30 wt % to about 35 wt %, about 35 wt % to about 80 wt %, about 35 wt % to about 75 wt %, about 35 wt % to about 70 wt %, about 35 wt % to about 65 wt %, about 35 wt % to about 60 wt %, about 35 wt % to about 55 wt %, about 35 wt % to about 50 wt %, about 35 wt % to about 45 wt %, about 35 wt % to about 40 wt %, about 40 wt % to about 80 wt %, about 40 wt % to about 75 wt %, about 40 wt % to about 70 wt %, about 40 wt % to about 65 wt %, about 40 wt % to about 60 wt %, about 40 wt % to about 55 wt %, about 40 wt % to about 50 wt %, about 40 wt % to about 45 wt %, about 45 wt % to about 80 wt %, about 45 wt % to about 75 wt %, about 45 wt % to about 70 wt %, about 45 wt % to about 65 wt %, about 45 wt % to about 60 wt %, about 45 wt % to about 55 wt %, about 45 wt % to about 50 wt %, about 50 wt % to about 80 wt %, about 50 wt % to about 75 wt %, about 50 wt % to about 70 wt %, about 50 wt % to about 65 wt %, about 50 wt % to about 60 wt %, about 50 wt % to about 55 wt %, about 55 wt % to about 80 wt %, about 55 wt % to about 75 wt %, about 55 wt % to about 70 wt %, about 55 wt % to about 65 wt %, about 55 wt % to about 60 wt %, about 60 wt % to about 80 wt %, about 60 wt % to about 75 wt %, about 60 wt % to about 70 wt %, about 60 wt % to about 65 wt %, about 65 wt % to about 80 wt %, about 65 wt % to about 75 wt %, about 65 wt % to about 70 wt %, about 70 wt % to about 80 wt %, about 70 wt % to about 75 wt %, or about 75 wt % to about 80 wt %, based on the total weight of the composition.

In any of the aspects or embodiments described herein, the molecular weights of each of the polymeric amphiphilic agent preferably are about the same or greater than the chain entanglement molecular weight of the polymer. The chain entanglement molecular weight (Mc) defines the chain length required for the onset of chain entanglements. Chain entanglements provide topological constraints to chain motion, and allow the polymer to behave like a crosslinked network and bear stress; this ability is sometimes known as green strength or web strength. Below the Mc, uncrosslinked polymer systems have no such constraints and therefore lack elasticity and undergo chain slippage and large-scale stress relaxation. For many polymers, Mc is taken as the inflection point observed for polymers in plots of viscosity against increasing molecular weight ("Viscoelastic Properties of Polymers," 3rd ed., J. D. Ferry, p. 242, John Wiley & Sons, NY (1980)). As the molecular weight of the polymeric amphiphilic agent is increased above the Mc, the cohesive strength can increase. The chain entanglement molecular weight is determined using polymer rheology to obtain the plateau modulus. This calculation is described in Ganewatta et al. ("Biobased Plastics and Elastomers from Renewable Rosin via 'Living' Ring Opening Metathesis Polymerization," Macromolecules, September 2016), herein incorporated by reference.

In any of the aspects or embodiments described herein, the HMA composition can include a polyolefin base polymer. In any of the aspects or embodiments described herein, the base polymer can be a homopolymer and/or a copolymer. As used herein, a "copolymer" refers to a polymer having two or more repeating units. In any of the aspects or embodiments described herein, the base polymer can include a single homopolymer or copolymer or a mixture of two or more homopolymers and/or copolymers. In any of the aspects or embodiments described herein, the polyolefin base polymer can be prepared using a metallocene-catalyzed process. In any of the aspects or embodiments described herein, the polyolefin base polymer can be an elastomer based on a polyethylene backbone. As used herein "elastomer" means a polymer that displays rubber-like elasticity. In any of the aspects or embodiments described herein, the polyolefin base polymer is a copolymer derived from an olefin and an alpha-olefin. Exemplary copolymers, in any of the aspects or embodiments described herein, include polymers of ethylene or propylene with one or more relatively nonpolar α-olefins such as 1-butene, 1-hexene, and the like. In any of the aspects or embodiments described herein, the base polymer is a copolymer of ethylene and propylene. An exemplary commercially available base polymer includes DOW AFFINITY (e.g., 1900, 1950).

In any of the aspects or embodiments described herein, the HMA composition can include a linear or branched hydrocarbon wax. Waxes can be added to adjust the melt viscosity, to increase the hot tack, to increase the low temperature adhesion performance, to increase peel adhesion performance, and/or shear adhesion performance.

Paraffin waxes, which are products of oil refining, are hydrocarbon mixtures with the general formula $C_nH_{2n+2}$ wherein n ranges from about 20 to about 40. Fischer-Tropsch waxes are synthetic waxes produced by the Fischer-Tropsch process, which is a method for the synthesis of hydrocarbons and other aliphatic compounds from a mixture of hydrogen and carbon monoxide in the presence of a catalyst. The gaseous mixture is obtained by coal gasification or natural gas reforming. The waxes are fractionated by chain length and are characterized as substantially saturated and linear aliphatic chains free of aromatic, sulfurous, and nitrogenous content. Exemplary commercially available Fischer-Tropsch waxes include SASOLWAX, for example SASOLWAX H 1. Low molecular weight polyethylene or polypropylene waxes, other than those polymerized by metallocene catalysts, are low molecular weight polymers made by direct polymerization of ethylene and propylene under conditions whereby molecular weight is controlled. The linear or branched hydrocarbon wax can be present from about 1 to about 30 wt %, or from about 1 to about 25 wt %, each based on the total weight of the composition.

Additional components employed in any of the hot melt adhesive compositions described herein include antioxidants and/or free radical scavengers. Because during use the HMA compositions are often held at high temperatures in a molten state for extended periods of time, for example in a holding tank or cartridge, these materials are commonly employed in hot melt adhesive formulations in order to increase thermal stability. In any of the aspects or embodiments described herein, antioxidants such as hindered phenols are employed in the hot melt adhesive compositions. In any of the aspects or embodiments described herein, representative hindered phenols include 1,3,5-trimethyl-2,4,6-tris(3-5-di-tert-butyl-4-hydroxybenzyl)benzene; pentaerythritol tetrakis-3(3,5-di-tert-butyl-4-hydroxyphenyl)propionate; n-octadecyl-3(3,5-ditert-butyl-4-hydroxyphenyl)propionate; 4,4'-methylenebis (4-methyl-6-tert butylphenol); 4,4'-thiobis(6-tert-butyl-o-cresol); 2,6-di-tert-butylphenol; 6-(4-hydroxyphenoxy)-2,4-bis(n-ocytlthio)-1,3,5-triazine; 2,4,6-tris(4-hydroxy-3,5-di-tert-butyl-phenoxy)-1,3,5-triazine; di-n-octadecyl-3,5-di-tert-butyl-4-hydroxybenzylphosphonate; 2-(n-octylthio) ethyl-3,5-di-tert-butyl-4-hydroxybenzoate; and sorbitol hexa-(3,3,5-di-tert-butyl-4-hydroxy-phenyl)propionate. One example of a useful hindered phenol is IRGANOX® 1010 (pentaerythritol tetrakis(3-(3,5-di-tert-butyl-4-hydroxyphenyl)propionate), available from BASF Corp. of Florham Park, N.J.), and free radical scavengers such as, but not limited to, butylated hydroxytoluene or "BHT", and butylated hydroxyanisole or "BHA." Antioxidants can be present up to about 5 wt %, from about 0.01 to about 2 wt %, from about 0.01 to about 1 wt %. or from about 0.1 to about 1 wt %.

In any of the aspects or embodiments described herein, the HMA composition can include one or more additional polymer different from the base polymer. The one or more additional polymers must be compatible with the propylene copolymer; that is, they do not undergo substantial phase separation from the HMA composition either in the melt or during and after solidification. Other than this limitation, the specific type and the amount of the additional polymer(s) used in the HMA compositions are not particularly limited. In some embodiments, the one or more additional polymers is a higher molecular weight polymer and increases the cohesive strength of the HMA compositions. In any of the aspects or embodiments described herein, the addition of one or more additional polymers increases the peel strength of the HMA compositions after application to the intended substrate. In any of the aspects or embodiments described herein, the one or more additional polymers are elastomers. In any of the aspects or embodiments described herein, the one or more additional polymers increase the hot tack of the hot melt adhesive. In any of the aspects or embodiments described herein, the one or more additional polymers increase the low temperature adhesion performance of the of the hot melt adhesive compositions. In any of the aspects or embodiments described herein, the one or more additional polymers are added to decrease the overall cost of the compositions without compromising key physical properties as otherwise described herein. In any of the embodiments of the HMA compositions where one or more additional polymers are employed, the one or more additional polymers are included in the composition at about 1 to about 20 wt %, about 1 to about 10 wt % or about 1 to about 5 wt %, each based on the total weight of the composition.

In any of the aspects or embodiments described herein, an additive composition can be used, comprising one or more additives selected to achieve a desired property, with the proviso that the additive(s) are also selected so as to not significantly adversely affect a desired property of the HMA composition. The additive composition or individual additives can be mixed at a suitable time during the mixing of the components for forming the composition. The additive composition can include an impact modifier, flow modifier, filler (e.g., a particulate polytetrafluoroethylene (PTFE), glass, carbon, mineral, or metal), reinforcing agent (e.g., glass fibers, silica), heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g., a dye or pigment), surface effect additive, radiation stabilizer, flame retardant, anti-drip agent (e.g., a PTFE-encapsulated styrene-acrylonitrile copolymer (TSAN)), or a combination thereof. When present, additives are each added to the HMA compositions in amounts of up to about 5 wt %, or up to about 3 wt %, or up to about 1 wt %, each based on the total weight of the composition.

The HMA compositions are formed using conventional techniques. Procedures and methods for formulating HMA compositions are well known in the art. Any of these procedures may be used to blend and prepare the HMA compositions. The method of blending and preparing the HMA compositions is not particularly limited. Descriptions of those procedures and methods are reviewed, for example, in Skeist, Irving, *Handbook of Adhesives*, Van Nostrand Reinhold International; 3rd edition (1990).

The HMA composition can be substantially free of tackifying resins other than the rosin acids and derivatives thereof. Tackifying resins, or tackifiers, typically have low molecular weights and are resinous, and have glass transition and softening point temperatures well above typical room temperatures. In some embodiments, tackifying resins are based on natural products, for example terpenes, which are based on polymerized α- or β-pinene based compounds. In other embodiments, petroleum-based hydrocarbon resins are tackifying resins useful in the HMA compositions. Such materials are often formed by polymerization of aliphatic hydrocarbon materials to form an amorphous polymer. In embodiments, the petroleum hydrocarbon resin is hydrogenated or modified with aromatic functionality to improve thermal stability. In embodiments, the tackifying resins other than the rosin acids and derivatives thereof have a softening point of about 80 to about 180° C., or about 100 to 150° C., or about 80 to about 130° C. As used herein, "substantially free of tackifying resins other than the rosin acids and derivatives thereof" means that the HMA composition includes about 10 wt % or less, about 5 wt % or less, or about 1 wt % or less of a tackifying resin other than the rosin acids and derivatives thereof, based on the total weight of the HMA composition. In any of the aspects or embodiments described herein, tackifying resins other than the rosin acids and derivatives thereof are absent from the HMA compositions.

The HMA compositions can include a rosin ester and an amphiphilic agent. In any of the aspects or embodiments described herein, the composition includes about 5 to about 30 wt %, or 5 to about 25 wt %, or 5 to about 20 wt %, or 5 to about 15 wt %, or 5 to about 10 wt % palmityl alcohol, stearyl alcohol, or a combination thereof. In any of the aspects or embodiments described herein, the composition includes a pentaerythritol ester of a rosin acid and greater than about 5 wt % to about 15 wt % palmityl alcohol, stearyl alcohol, or a combination thereof. In any of the aspects or embodiments described herein, the composition includes a pentaerythritol ester of a maleated rosin acid and greater than about 10 to about 25 wt % of palmityl alcohol, stearyl alcohol, or a combination thereof.

In any of the aspects or embodiments described herein, the HMA composition can include a rosin ester and an amphiphilic agent including ethylene (bis-stearate) (EBS). In any of the aspects or embodiments described herein, the composition includes a glycerol ester of a rosin acid and up to about 20 wt %, up to about 10 wt %, from about 1 to about 20 wt %, from about 1 to about 10 wt %, or from about 5 to about 10 wt % of an amphiphilic agent including EBS, each based on the total weight of the composition. In any of the aspects or embodiments described herein, the composition includes a glycerol ester of a rosin acid and greater than about 5 wt % of an amphiphilic agent including ethylene (bis-stearate), stearyl alcohol palmityl alcohol, or a combination thereof. Within this range, in any of the aspects or embodiments described herein, the amphiphilic agent can be present from greater than about 5 wt % to about 50 wt %, greater than about 5 wt % to about 45 wt %, greater than about 5 wt % to about 40 wt %, greater than about 5 wt % to about 35 wt %, greater than about 5 wt % to about 30 wt %, greater than about 5 wt % to about 25 wt %, or greater than about 5 wt % to about 20 wt %.

In any of the aspects or embodiments described herein, the HMA composition can include a rosin ester and an amphiphilic agent including a combination of EBS (e.g., Kemamide® EBS) and palmityl alcohol. In any of the aspects or embodiments described herein, the composition includes a pentaerythritol ester of a rosin acid and greater than about 5 wt % or greater than about 7.5 wt % of EBS and palmityl alcohol. Within these ranges, in any of the aspects or embodiments described herein, the amphiphilic agent including EBS and palmityl alcohol can be present from about 5 wt % to about 50 wt %, about 5 wt % to about 45 wt %, about 5 wt % to about 40 wt %, about 5 wt % to about 35 wt %, about 5 wt % to about 30 wt %, about 5 wt % to about 25 wt %, about 5 wt % to about 20 wt %, about 7.5 wt % to about 50 wt %, about 7.5 wt % to about 45 wt %, about 7.5 wt % to about 40 wt %, about 7.5 wt % to about 35 wt %, about 7.5 wt % to about 30 wt %, about 7.5 wt % to about 25 wt %, or about 7.5 wt % to about 20 wt %.

In any of the aspects or embodiments described herein, the HMA composition can include a rosin ester and an amphiphilic agent having a melting point above 100° C., a softening point above 100° C., or a combination thereof. In any of the aspects or embodiments described herein, the composition includes about 60 to about 80 wt % rosin ester, preferably a pentaerythritol ester, and about 40 to about 60 wt % of the amphiphilic agent, preferably a polyethylene monoalcohol.

In any of the aspects or embodiments described herein, the HMA composition includes a polyolefin base polymer and a linear or branched hydrocarbon wax, in addition to a rosin ester and an amphiphilic agent having a melting point above 100° C., a softening point above 100° C., or a combination thereof. In any of the aspects or embodiments described herein, the composition includes about 35 to about 55 wt % of a polyolefin elastomer, about 10 to about 30 wt % wax, and about 35 to about 65 wt % of a combination of: about 10 wt % to about 30 wt % of the amphiphilic agent and, preferably a polyethylene monoalcohol and about 60 to about 90 wt % rosin ester, preferably a pentaerythritol ester, based on the total weight of the composition.

EXAMPLES

Example 1: Palmityl alcohol and stearyl alcohol were investigated as amphiphilic agents. It was added to rosin ester tackifier (WestRez® 5101 or WestRez® 5230) at 5.0, 10.0, and 20.0 wt % loadings at 177° C. WestRez® 5101 is a commercially available rosin ester of pentaerythritol. WestRez® 5230 is pentaerythritol ester of maleated rosin. Then, the tackifier packages were tested at 40.0 wt % loadings in HMA compositions having polyolefins (40.0 wt %) (Dow Affinity 1900/1950 @ 50.0 wt % each), wax 20.0 wt % (Sasol H1), and antioxidant 0.5 wt % (Sanox 1010/565 @ 2:1). The softening points of the blended tackifiers were measured. The initial compatibility of the HMA compositions was visually inspected. The data are provided in Table 1. Incompatibility is observed with the naked eye when the composition turns opaque and white. In contrast, compatible compositions appear clear to the naked eye.

TABLE 1

The compositions and properties of the HMAs tested where palmityl alcohol was evaluated as the amphiphilic agent.

| Composition of blended tackifiers | | | | Properties | |
|---|---|---|---|---|---|
| WestRez ® 5101 (wt %) | WestRez ® 5230 (wt %) | Palmityl alcohol (wt %) | Stearyl alcohol (wt %) | Softening point (° C.) | Initial HMA compatibility |
| 100.0 | 0.0 | 0.0 | 0.0 | 99.8 | Incompatible |
| 95.0 | 0.0 | 0.0 | 5.0 | <99 | Incompatible |
| 90.0 | 0.0 | 0.0 | 10.0 | <99 | Compatible |
| 95.0 | 0.0 | 5.0 | 0.0 | 92.5 | Incompatible |
| 90.0 | 0.0 | 10.0 | 0.0 | 86.2 | Compatible |
| 0.0 | 100.0 | 0.0 | 0.0 | 130.0 | Incompatible |
| 0.0 | 95.0 | 5.0 | 0.0 | 115.6 | Incompatible |
| 0.0 | 90.0 | 10.0 | 0.0 | 102.4 | Incompatible |
| 0.0 | 80.0 | 20.0 | 0.0 | 84.2 | Compatible |

Example 2: Ethylene bis(stearamide) (EBS) was used as the amphiphilic agent. It was added to rosin ester tackifiers (WestRez® 5101 or WestRez® 5090 or WestRez® 5085) at various weight percentages at 177° C. Then they were tested at 40.0 wt % loadings in HMA compositions having polyolefins (40.0 wt %) (Dow Affinity 1900/1950 @50.0 wt % each), wax 20.0 wt % (Sasol H1), and antioxidant 0.5 wt % (Sanox 1010/565 @ 2:1). The softening points of the blended tackifiers were measured. The initial compatibility and accelerated aging compatibility of the HMA compositions were visually inspected. Accelerated aging test was carried out for samples with sufficient tackifier softening points by keeping the HMA composition open to air at 177° C. for 96 hours. The data are provided in Table 2. Incompatibility is observed when the composition turns opaque and white. In contrast, compatible compositions are clearer to the normal eye. Although EBS resulted in improved compatibility char and speck formation during the 96-h aging test was observed.

TABLE 2

The compositions and properties of the HMAs tested where EBS was evaluated as the amphiphilic agent.

| Tackifier composition | | | | Properties | | |
|---|---|---|---|---|---|---|
| WestRez ® 5101 (wt %) | WestRez ® 5092 (wt %) | WestRez ® 5090 (wt %) | EBS (wt %) | Softening point of the blended tackifier (° C.) | Initial HMA Combatibility | Aged HMA Combatibility |
| 100.0 | 0.0 | 0.0 | 0.0 | 99.8 | Incompatible | Incompatible |
| 97.5 | 0.0 | 0.0 | 2.5 | 100.4 | Incompatible | Incompatible |
| 95.0 | 0.0 | 0.0 | 5.0 | 103.5 | Compatible | Incompatible |
| 92.5 | 0.0 | 0.0 | 7.5 | 115.9 | Compatible | Compatible |
| 90.0 | 0.0 | 0.0 | 10.0 | 118.1 | Compatible | Compatible |
| 80.0 | 0.0 | 0.0 | 20.0 | 128.6 | Compatible | Compatible |
| 75.0 | 0.0 | 0.0 | 25.0 | 139.0 | Compatible | Compatible |
| 0.0 | 100.0 | 0.0 | 0.0 | 89.5 | Compatible | Incompatible |
| 0.0 | 95.0 | 0.0 | 5.0 | 102.6 | Compatible | Compatible |
| 0.0 | 92.5 | 0.0 | 7.5 | 113.8 | Compatible | Compatible |
| 0.0 | 0.0 | 100.0 | 0.0 | 89.5 | Compatible | Incompatible |
| 0.0 | 0.0 | 95.0 | 5.0 | 102.0 | Compatible | Compatible |
| 0.0 | 0.0 | 92.5 | 7.5 | 109.5 | Compatible | Compatible |

Example 3: Three component tackifier blends were prepared to improve the oxidative stability. Here, WestRez® 5101, Kemamide EBS, and palmityl alcohol were formulated to obtain rosin-based tackifiers. Interestingly, the softening points of the blends remained high even at low EBS loadings. This may be due to co-crystallization of EBS and palmityl alcohol. These compositions were aged open to air at 177° C. for 96 hours. However, specking and charring was observed near the air-liquid interface. The following Table 3 illustrates the compositions and respective softening points.

TABLE 3

Three component tackifier blend composition and softening point results

| Tackifier Composition | | | |
|---|---|---|---|
| WestRez® 5101 (wt %) | Kemamide EBS (wt %) | Palmityl alcohol (wt %) | Softening point of the blended tackifier (° C.) |
| 100.0 | 0.00 | 0.00 | 99.8 |
| 90.0 | 8.5 | 1.5 | 120.0 |
| 90.0 | 8.0 | 2.0 | 118.7 |
| 90.0 | 7.5 | 2.5 | 117.0 |
| 90.0 | 5.0 | 5.0 | 107.5 |
| 92.5 | 3.75 | 3.75 | 98.3 |
| 95.0 | 2.5 | 2.5 | 102.1 |

Example 4 & 5: Polyethylene monoalcohol compositions were tested as melt phase amphiphilic agents. Various compositions of HMAs were prepared using metallocene catalyzed polyolefins (Dow Affinity 1900 and 1950), rosin esters of pentaerythritol (WestRez® 5101), polyethylene monoalcohol waxes (Unilin™ 700 or Unilin™ 1000), and Sasolwax H1 Fischer-Tropsch (FT) hard wax were prepared according to the Table 4 to evaluate the compatibility and heat stability. After the solid materials were transferred to 50 mL glass jars, they were kept in an oven at 177° C. After the solids were melted in about 1 hr, the compositions were rapidly mixed until clear. Then accelerated aging test was carried out open to air at 177° C. for 96 hours. For control tackifier resins, hydrogenated hydrocarbon resin, a 50.0 wt % blend of Eastotac H-130W and Eastotac H-110W, was used. Polyterpene tackifier control was Sylvares TR126. The metallocene catalyzed polyolefins composition was prepared by adding Dow Affinity 1900 and 1950 at 50.0 wt % each into the composition. Same performances were observed when the rosin ester and the functional wax was blended prior to HMA composition preparation or added as separately into the HMA compositions. The results are provided in Table 4.

TABLE 4

Composition and compatibility data for the HMAs made with polyethylene monoalcohol waxes.

| HMA composition | | | | | | | | Compatibility | |
|---|---|---|---|---|---|---|---|---|---|
| Polyolefin (Dow Affinity 1900/1950 @50 wt %) | Sasol H1 wax (g) | HHC resin (H-130W and H-110W @50 wt % each) | Polyterpene resin (Sylvares TR126) (wt %) | WestRez 5101 (wt %) | Unilin™ 1000 (wt %) | Unilin™ 700 (wt %) | Antioxidant (Sanox 1010/565 @ 2:1) (wt %) | Initial combatibility | Aged combatibility |
| 40.0 | 20.0 | 0.0 | 0.0 | 40.0 | 0.00 | 0.00 | 0.5 | Incomp | Incomp |
| 40.0 | 20.0 | 40.0 | 0.0 | 0.0 | 0.00 | 0.00 | 0.5 | Comp | Comp |
| 40.0 | 20.0 | 0.0 | 40.0 | 0.0 | 0.00 | 0.00 | 0.5 | Comp | Comp |
| 40.0 | 20.0 | 0.0 | 0.0 | 40.0 | 0.00 | 0.00 | 0.5 | Incomp | Incomp |
| 40.0 | 20.0 | 0.0 | 0.0 | 38.0 | 2.0 | 0.00 | 0.5 | Incomp | Incomp |
| 40.0 | 20.0 | 0.0 | 0.0 | 37.0 | 3.0 | 0.00 | 0.5 | Incomp | Incomp |
| 40.0 | 20.0 | 0.0 | 0.0 | 36.0 | 4.0 | 0.00 | 0.5 | Incomp | Incomp |
| 40.0 | 20.0 | 0.0 | 0.0 | 35.0 | 5.0 | 0.00 | 0.5 | Incomp | Incomp |
| 40.0 | 20.0 | 0.0 | 0.0 | 34.0 | 6.0 | 0.00 | 0.5 | Comp | Incomp |
| 40.0 | 20.0 | 0.0 | 0.0 | 32.0 | 8.0 | 0.00 | 0.5 | Comp | Incomp |
| 40.0 | 20.0 | 0.0 | 0.0 | 30.0 | 10.0 | 0.00 | 0.5 | Comp | Incomp |
| 40.0 | 20.0 | 0.0 | 0.0 | 28.0 | 12.0 | 0.00 | 0.5 | Comp | Comp |
| 40.0 | 20.0 | 0.0 | 0.0 | 34.0 | 0.00 | 6.0 | 0.5 | Comp | Incomp |
| 40.0 | 20.0 | 0.0 | 0.0 | 32.0 | 0.00 | 8.0 | 0.5 | Comp | Incomp |
| 40.0 | 20.0 | 0.0 | 0.0 | 30.0 | 0.00 | 10.0 | 0.5 | Comp | Incomp |
| 40.0 | 20.0 | 0.0 | 0.0 | 28.0 | 0.00 | 12.0 | 0.5 | Comp | Comp |

*Incomp = Incompatible
*Comp = Compatible

Example 6 & 7: Rosin-based tackier was prepared by melt blending of rosin ester with amphiphilic wax. Rosin esters of pentaerythritol (WestRez® 5101) 140.0 g was transferred to a 500 mL four-neck round bottom flask equipped with an air driven agitator, condenser, nitrogen sparge tube, and a thermocouple. It was blended with polyethylene monoalcohol wax 60.0 g (Unilin™ 700 or 1000) at 180° C. under a nitrogen blanket for 1 h. Then the product was poured into a container and stored. In Table 5, Tackifier 1 consists of WestRez® 5101 with 30.0 wt % Unilin™ 700 and Tackifier 2 consists of WestRez® 5101 with 30.0 wt % Unilin™ 1000. Various physical properties were measured along with control samples.

TABLE 5

The properties of the control and blended rosin-based tackifier samples are given in the following table. Bio-content data is obtained from literature-based calculations.

| Tackifier | Bio Content | Softening Point (° C.) | Color (Gardner) Initial | Color (Gardner) Aged | Viscosity (cps) Initial | Viscosity (cps) Aged |
|---|---|---|---|---|---|---|
| Hydrogenated Hydrocarbon | 0% | 120.1 | <1.0 | 3.1 | 1360 | 1770 |
| Polyterpene | 99% | 126.0 | 1.8 | 11.6 | 2590 | 5230 |
| Tackifier 1 | 65% | 104.8 | 3.2 | 12.3 | 18 | 22 |
| Tackifier 2 | 65% | 113.7 | 3.1 | 11.8 | 24 | 28 |

Example 8: The benefit of having crystallinity to improve the softening point as well as the compatibility of the amphiphilic wax and rosin ester tackifier is exemplified by DSC results (Table 5). DSC data were collected between 25° C. and 180° C. using the second cycle. The amphiphilic agent EBS showed the highest melting point and the most improvement of the softening point with lowest emulsifier loading. However, polyethylene monoalcohol wax showed better compatibility with the rosin ester tackifiers as seen by the increase in the $T_g$ (Table 6).

TABLE 6

DSC results for the blended rosin ester tackifier compositions.

| Tackifier composition (wt %) | | | | Thermal properties of the tackifiers (° C.) | | |
|---|---|---|---|---|---|---|
| Rosin ester | Amphiphilic agent | | | | | |
| WestRez® 5101 | Kemamide® EBS | Unilin™ 700 | Unilin™ 1000 | Softening Point | $T_g$ | $T_m$ |
| 100.0 | 0.0 | 0.0 | 0.0 | 99.8 | 54.0 | — |
| 92.5 | 7.5 | 0.0 | 0.0 | 115.9 | 50.3 | 120.4 |
| 70.0 | 0.0 | 30.0 | 0.0 | 104.8 | 55.7 | 102.0 |
| 70.0 | 0.0 | 0.0 | 30.0 | 113.7 | 70.3 | 109.0 |

Example 9: In addition to visual observations for compatibility of the HMA compositions, viscosity and IR spectra were investigated. For this purpose, HMA samples of 100 g were prepared in 8 oz glass jars and aged open to air at 177° C. for 96 hours. Standard HMA composition was used polyolefins (40.0 wt %) (Dow Affinity 1900/1950 @50.0 wt % each), tackifier composed of WestRez® 5101 with 30.0 wt % wax Unilin™ 700 (Tackifier 1) or Unilin™ 1000 (Tackifier 2) (total tackifier in the HMA maintained at 40.0 wt % or 60.0 wt %) FT hydrocarbon wax (20.0 or 0.0 wt %) (Sasol H1), and antioxidant 0.5 wt % (Sanox 1010/565 @ 2:1). When the rosin-based tackifiers were used at 60.0 wt % in the HMA composition, FT wax was not used. After aging, the compositions were cooled to room temperature and samples were taken from the top and the bottom of the solid HMAs using a hot knife for viscosity and IR data analysis. Viscosity was measured at 177° C. using a Brookfield DVE viscometer. Similar viscosity and IR peak overlap of the top and bottom samples for each composition indicate compatibility. The HMA samples with rosin ester tackifiers, the IR peak for the ester group at 1733 $cm^{-1}$ is indicative of rosin ester migration. For the HMA composition with only WestRez® 5101 (40.0 wt %) as the tackifier, sharper ester peak was observed for the bottom sample compared to the top sample. Table 7 contains the results from this example.

TABLE 7

Compatibility testing data for the HMA compositions using viscosity and IR data.

| Tackifier in the HMA composition (loading, wt %) | Viscosity at 177° C. after 96 h (cps) Top | Bottom | IR peak overlap | Compatibility |
|---|---|---|---|---|
| Hydrogenated Hydrocarbon (40%) | 1025 | 1036 | Yes | Compatible |
| Polyterpene (40%) | 953 | 980 | Yes | Compatible |
| WestRez® 5101 (40%) | 1240 | 582 | No | Incompatible |
| Tackifier 1 (40%) | 605 | 596 | Yes | Compatible |
| Tackifier 2 (40%) | 653 | 650 | Yes | Compatible |
| Tackifier 1 (60%) | 895 | 883 | Yes | Compatible |
| Tackifier 2 (60%) | 1034 | 1024 | Yes | Compatible |

Example 10: HMA compositions were prepared following the standard composition with polyolefins (40.0 wt %) (Dow Affinity 1900/1950 @50.0 wt % each), tackifier composed of WestRez® 5101 with 30.0 wt % polyethylene monoalcohol wax Unilin™ 700 (Tackifier 1) or Unilin™ 1000 (Tackifier 2) where the total tackifier amount in the HMA composition was maintained at 40.0 wt %, FT wax (20.0 wt %) (Sasol H1), and antioxidant 0.5 wt % (Sanox 1010/565 @ 2:1). The viscosity of the samples were measured at 177° C. using a Brookefield DVE viscometer (Table 8).

TABLE 8

Viscosity profiles of the HMA compositions.

| Tackifier in the HMA composition | Initial viscosity of HMA (cps) 150° C. | 177° C. | 200° C. |
|---|---|---|---|
| Hydrogenated Hydrocarbon | 1979 | 983 | 587 |
| Polyterpene | 1990 | 1030 | 575 |
| Tackifier 1 | 1188 | 630 | 397 |
| Tackifier 2 | 1250 | 665 | 457 |

Example 11: Comparison testing of open time and set speed was conducted using the HMAs prepared according to Example 8. Open time denotes the time during which the surface tack of the applied adhesive melt is retained on the surface. Se time is the time to develop acceptable bond strength at room temperature. Adhesive films of 15-20 mil thickness were made using molten HMA samples. Once at room temperature, the films were cut into strips 0.5 inches wide by 6 inches long. The test samples and comparative control were placed parallel on preheated 20 lb printer paper. The samples and sheet were placed in 177° C. oven for two minutes to activate adhesives. Then, the samples were removed from oven and a secondary substrate was applied using a 1 kg roller. The secondary substrate was slowly peeled from the primary substrate until adhesives set. The results of open time/set speed of rosin-based HMA compositions relative to the hydrogenated hydrocarbon-based HMA can be found in the following table (Table 9).

TABLE 9

Open time and set speed comparison of the HMAs.

| Tackifier in the HMA composition | Hydrogenated hydrocarbon resin Open time | Set speed |
|---|---|---|
| Tackifier 1 | Equal | Equal |
| Tackifier 2 | Equal | Slower |

Example 12: Fiber tear testing was conducted by first using a Rocktenn bond maker to apply adhesive to 100% recycled corrugated cardboard corrugate substrates. The primary substrate and secondary substrates were arranged such that both flute orientation and cardstock surface (ridged versus smooth) alternated. Once prepared, samples were conditioned for a period of 24 hours at five different temperatures: −17, 4, 23, 49, and 60° C. For each temperature, sample size equaled five. Once conditioned, the primary and secondary substrates were peeled and percentage of fiber tear was approximated at 0, 25, 50, 75, or 100%. The fiber tear of the sample size was then averaged and considered "passing" if that number equaled 75% or higher. The results from the corrugate fiber tear testing can be found below (Table 10).

TABLE 10

Corrugate fiber tear testing data.

| Tackifier in the HMA composition | Fiber tear testing temperature −17° C. | 4° C. | 23° C. | 49° C. | 60° C. |
|---|---|---|---|---|---|
| Hydrogenated Hydrocarbon | 82.5% | 100% | 100% | 100% | 93% |
| Polyterpene | 0% | 80% | 100% | 100% | 100% |
| Tackifier 1 | 93% | 97% | 100% | 100% | 100% |
| Tackifier 2 | 77% | 93% | 100% | 100% | 100% |

Example 13: Surface energies of the HMA compositions were evaluated using contact angle measurements of the HMA films. The HMA compositions were prepared according to the standard composition with 40% tackifier loading. The films at 100 mil thickness were made using a film casting knife. Then, the contact angles were measured for water, ethylene glycol, DMSO, and diiodomethane. HMAs made with Tackifier 1 and Tackifier 2 showed higher polarity. The Owens-Wendt-Rabel-Kaelble (OWRK) Model was used to calculate the surface energy components. All the HMA films had similar surface energies ~29 mJ/m$^2$. However, the polar surface energy component of the HMAs made with Tackifier 1 and Tackifier 2 were higher than that of the compositions made with hydrogenated hydrocarbon tackifier and polyterpene tackifier. This is depicted in the wetting envelope (FIGURE).

The preceding general areas of utility are given by way of example only and are not intended to be limiting on the scope of the present disclosure and appended claims. Additional objects and advantages associated with the compositions, methods, and processes of the present disclosure will be appreciated by one of ordinary skill in the art in light of the instant claims, description, and examples. For example, the various aspects and embodiments of the disclosure may be utilized in numerous combinations, all of which are expressly contemplated by the present description. These additional aspects and embodiments are expressly included within the scope of the present disclosure. The publications and other materials used herein to illuminate the background of the disclosure, and in particular cases, to provide additional details respecting the practice, are incorporated by reference.

Thus, those skilled in the art will recognize, or be able to ascertain using no more than routine experimentation, many equivalents to the specific embodiments of the disclosure described herein. Such equivalents are intended to be encompassed by the following claims. It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired effects, additional ingredients may be added, and/or similar ingredients may be substituted for one or more of the ingredients described. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

What is claimed is:

1. A blend consisting of:
   a rosin acid or a derivative thereof; and
   an amphiphilic agent comprising at least one hydrocarbon chain having an average carbon number of 6 to 50 and a polar functional group, wherein the hydrocarbon chain is linear, branched, or cyclic,
   wherein the amphiphilic agent has a melting point above 100° C., a softening point above 100° C., or a combination thereof.

2. A hot-melt adhesive composition comprising the blend of claim 1 and at least one of a polyolefin base polymer, a linear or branched hydrocarbon wax, or a combination thereof.

3. The blend of claim 1, wherein the polar functional group comprises a hydroxyl group, a carboxylic acid group, a carboxylic ester group, an amide group, or an ethoxylate group.

4. The blend of claim 1, wherein the rosin acid or derivative thereof is derived from at least one of a gum tree rosin, a wood rosin, a softwood rosin, a hardwood rosin, a natural oil, or a combination thereof.

5. The blend of claim 1, wherein the rosin acid derivative is a hydrogenated rosin, disproportionated rosin, a maleated rosin, a fumarated rosin, itaconic acid adduct or anhydride adduct, an acrylic acid adduct, a dimer acid, or a combination thereof.

6. The blend of claim 1, wherein the rosin acid derivative is an ester of a rosin acid.

7. The blend of claim 1, wherein the rosin acid derivative is a hydrogenated rosin ester, disproportionated rosin ester, a maleated rosin ester, a fumarated rosin ester, an ester of an itaconic acid adduct, an itaconic anhydride adduct, an ester of an acrylic acid adduct, an ester of a dimer acid, or a combination thereof.

8. The blend of claim 6, wherein the ester of the rosin acid is derived from palmityl alcohol, stearyl alcohol, abietyl alcohol, polyethylene monoalcohol, hydroxyl-terminated polybutadiene, ethylene glycol, polyethylene glycol, propylene glycol, polypropylene glycol, glycerol, sorbitan, isosorbide, pentaerythritol, dipentaerythritol, tripentaerythritol, polypentaerythritol, or any combination thereof.

9. A hot-melt adhesive composition comprising the blend of claim 1 and a polyolefin base polymer prepared using a metallocene-catalyzed process.

10. A hot-melt adhesive composition comprising the blend of claim 1 and a polyolefin base polymer comprising a copolymer derived from ethylene and an alpha-olefin.

11. A hot-melt adhesive composition comprising the blend of claim 1 and a polyolefin base polymer that is an elastomer.

12. The blend of claim 1, wherein:
    the amphiphilic agent is present in an amount of about 5 to about 30 wt %, based on the total weight of the blend, and the amphiphilic agent is palmityl alcohol, stearyl alcohol, or a combination thereof; and
    the rosin acid derivative is a rosin ester.

13. The blend of claim 1, wherein:
    the amphiphilic agent is (i) stearyl alcohol that is present in an amount greater than about 5 to about 15 wt %, based on the total weight of the blend, or (ii) palmityl alcohol that is present in an amount greater than about 10 to about 25 wt %, based on the total weight of the blend; and
    the rosin acid derivative is an ester of a maleated adduct of a rosin acid.

14. The blend of claim 1, wherein:
    the rosin acid derivative is present in an amount of about 60 to about 80 wt %, based on the total weight of the blend, and the rosin acid derivative a pentaerythritol ester of a rosin acid; and
    the amphiphilic agent is present in an amount of about 20 to about 40 wt %, based on the total weight of the blend.

15. The blend of claim 1, wherein the amphiphilic agent is an alcohol, a fatty acid, a dimer acid, a fatty amide, a fatty aldehyde, a fatty ester, rosin alcohol, rosin ester, rosin amide, or a combination thereof.

16. The blend of claim 1, wherein the amphiphilic agent is palmityl alcohol, stearyl alcohol, octadecanol, abietyl alcohol, a polyethylene monoalcohol, ethylene (bis) stearate, a polyethylene alcohol, or a combination thereof.

17. The hot-melt adhesive composition of claim 2, wherein the composition is substantially free of a tackifying agent different from the rosin acid or derivative thereof.

18. The blend of claim 1, wherein the rosin acid derivative is a pentaerythritol ester of a maleated rosin acid and the amphiphilic agent is palmityl alcohol, stearyl alcohol, or a combination thereof, that is present in an amount greater than about 10 to about 25 wt %, based on the total weight of the blend.

19. The blend of claim 1, wherein:
    the rosin acid derivative is a glycerol ester of a rosin acid; and
    the amphiphilic agent is present in an amount of up to about 20 wt %, based on the total weight of the blend, and the amphiphilic agent is ethylene (bis-stearate).

20. The blend of claim 1, wherein:
    the rosin acid derivative is a glycerol ester of a rosin acid; and
    the amphiphilic agent is present in an amount of greater than about 5 wt %, based on the total weight of the blend, and the amphiphilic agent is ethylene (bis-stearate), stearyl alcohol palmityl alcohol, or a combination thereof.

21. The blend of claim 1, wherein:
    the rosin acid derivative is present in an amount of about 60 to about 80 wt %, based on the total weight of the blend, and the rosin acid derivative is a rosin ester; or the amphiphilic agent is present in an amount of about 40 to about 60 wt %, based on the total weight of the blend.

22. A hot-melt adhesive composition comprising:
about 35 to about 55 wt % of a polyolefin elastomer,
about 10 to about 30 wt % of a hydrocarbon wax, and
about 35 to about 65 wt % of the blend of claim 1, wherein:
  the amphiphilic agent is present in an amount of about 10 to about 40 wt %, based on the total weight of the blend, and
  the rosin acid or derivative thereof is a rosin ester that is present in an amount of about 60 to about 90 wt %, based on the total weight of the blend of a rosin ester.

* * * * *